March 3, 1942.  O. SEVERSON  2,275,326
TOOL BIT AND TOOL HOLDER THEREFOR
Filed Jan. 4, 1940
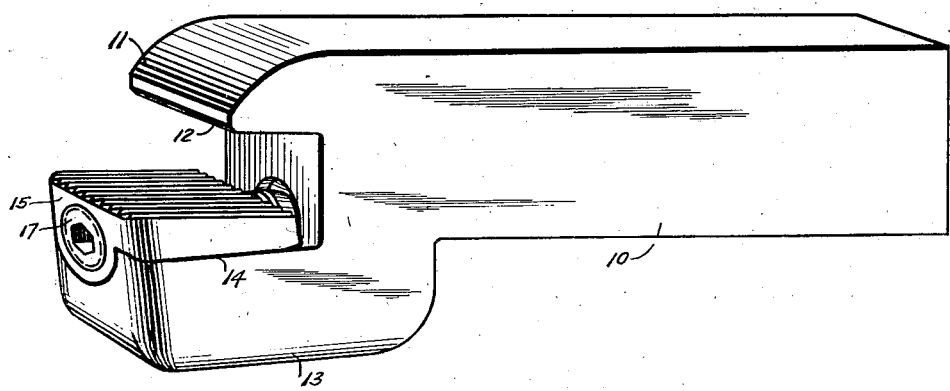
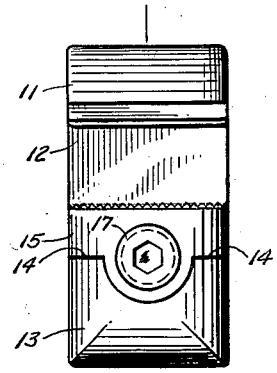
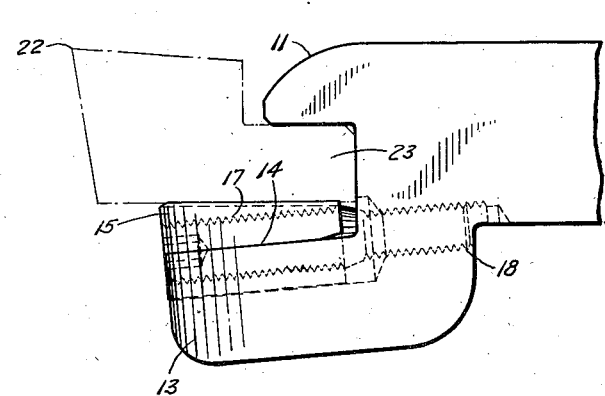
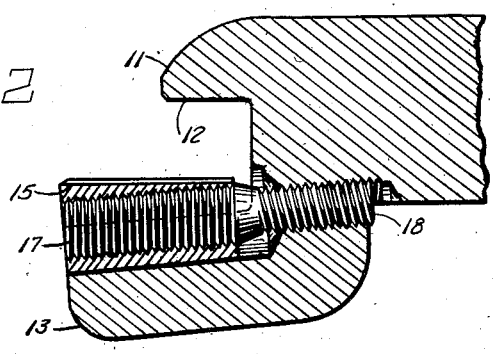
INVENTOR
OLE SEVERSON
BY *A. T. Sperry*
ATTORNEYS Patented Mar. 3, 1942

2,275,326

UNITED STATES PATENT OFFICE 2,275,326

TOOL BIT AND TOOL HOLDER THEREFOR

Ole Severson, Shelton, Conn., assignor to The Apex Tool and Cutter Company, Inc., a corporation of Connecticut Application January 4, 1940, Serial No. 312,367

2 Claims. (Cl. 29—96)

The invention relates to improvements in tool bits and tool holders therefor of the draw-bolt type and particularly designed for use in connection with metal working apparatuses, such as, boring mills, lathes, planers and the like.

It is among the general objects of the invention to provide a new and efficient bit and holder assembly, which will give increased rigidity to the structure holding a cutting tool in contact with the surface to be worked.

Another object of the invention is to provide the structure with an interrelationship of parts which is designed to reduce, to a minimum, the possibility of accidental movement between the bit and holder so as to avoid any chattering or vibration between tool and work.

Another important object is to provide in a rigid tool assembly easy adjustability in the relation of the bit to holder, the same being accessible without sacrifice of rigidity of parts after adjustment.

A further object is to provide a structure of minimum parts and maximum efficiency so as to achieve a novel simple and efficient device adopted to fill the need for an inexpensive durable tool holder.

This application is a companion application to my copending application Serial Number 281,408 and differs, therefore, in the provision of means accessible from the bit end of the holder for adjusting the wedge and thus locking and unlocking the bit. It has been found that commercial applications of the structure of my prior application have, in some instances, been limited because of the structure or arrangement of the tool post which precluded easy access to the adjusting mechanism. In the present invention this obstacle has been overcome.

Other objects and features of the invention will be apparent from a consideration of the present specification taken in connection with the accompanying drawing in which Figure 1 is a perspective view of one form of the present invention;

Figure 2 is a front elevation of that form of the invention shown in Figure 1;

Figure 3 is a detail side elevation of the head and;

Figure 4 is a detail sectional view through the head taken on lines 4—4 of Figure 2.

The tool holder is generally characterized by the provision of a furcated and elongated tool body, the furcation of which forms an integral stationary overlying tool engaging lip parallel with the axis of the body. The opposite face of the furcation is directed at an angle outwardly diverging from the body axis. A longitudinally movable wedge bears against the angled furcation wall and forms a serrated movable wedge seat. The shank of the tool bit is mounted in the furcation, its upper face engaged by the upper lip and its lower face engaged by the seat whereby longitudinal movement of the wedge seat will secure the shank against the lip. The wedge seat is adapted to be drawn inwardly to apply the holding force by means of a draw-bolt extending longitudinally through the wedge seat, its front end being arranged for engagement by an operating tool. The invention, is also, characterized by the provision of serrations between tool shank and wedge seat.

Referring more particularly to Figure 1 of the drawing, the numeral 10 indicates the body or shank of the tool holder, the forward end of which is furcated, including an upper furcation or lip 11 having a plane inner surface 12 lying in a plane parallel to the axis of the body, and a lower furcation 13 having an inner surface 14 diverging from the plane of surface 12 and the axis of the body. The seat wedge is indicated by the numeral 15, its upper face being serrated preferably longitudinally and lying at an angle to surface 14 and parallel to the plane of the face 12. The lower face of the wedge seat 15 lies parallel with the inner surface 14 of the lower furcation 13.

The surface 14 has a central longitudinally extending depression which receives a corresponding protrusion on the lower face of the wedge seat whereby the seat is guided in its longitudinal movements. The protrusion also provides a housing for the operating bolt 17.

The bolt 17 is a compound bolt in its inner extremity being threaded as at 18 to threadedly engage the body at the juncture of furcation 13 therewith and thus to be longitudinally adjustable with respect to the head by rotation. The bolt is rotatable with respect to the seat wedge but is longitudinally movable therewith. The herein disclosed preferred arrangement being by reversely threading the bolt body and the bore of the seat wedge, the pitch of the engaging bolt and wedge threads being less than end bolt threads which engage the body. Thus upon turning the bolt in clock wise direction, it will move longitudinally into the body, while the wedge will also move, but to a less extent into the furcation and thus a leverage is obtained to provide for a secure locking of the bit shank between the seat wedge and the lip.

The tool bit, itself, includes the cutting edge 22 and the tool shank 23, the latter having a lower longitudinally serrated face which cooperates with the serrations of the face 14 of the seat wedge in providing means for precluding transverse movement of the bit with respect to the tool seat.

With regard to the serrations, it is understood that an interchange of the serrations between top and bottom of the shank may be resorted to and star serrations may, if desired, be used between wedge and shank in lieu of shank and tool seat serrations. Thus it will be seen that the full use of equivalents may be resorted to without departure from the spirit or scope of the invention. It will be understood that such changes and modifications will not constitute a departure from the spirit or scope of the present invention as outlined in the appended claims.

What I claim is:

1. In a tool bit and holder combination, a holder having a furcated end, the opposite inner surfaces of the furcation being angularly disposed, a tool bit having its shank disposed between said surfaces, a bit retaining member having one surface parallel with one surface of the furcation and the opposite surface of the furcation surface parallel with another, means for moving said retaining member longitudinally within said furcation and comprising a compound bolt having a threaded portion engaging said member and an oppositely threaded portion engaging said holder.

2. In a tool bit and holder combination, a holder having a furcated end, the opposite inner surfaces of the furcation being angularly disposed, a tool bit having its shank disposed between said surfaces, a bit retaining member having one surface parallel with one surface of the furcation and the opposite surface of the furcation surface parallel with another, means for moving said retaining member longitudinally within said furcation and comprising a compound bolt threadedly engaging said member and threadedly engaging said holder, said threaded engagements being in opposite directions and different in pitch whereby longitudinal movement of the bolt will be coordinated with but different in amplitude from the movements of said member.

OLE SEVERSON.